D. TURNER.
LOCK FOR NOTCHING SHEARS OF MEASURING MACHINES.
APPLICATION FILED MAY 5, 1920.

1,421,863.   Patented July 4, 1922.
4 SHEETS—SHEET 1.

Inventor:
Douglas Turner.
By Elliott & Ammen
Attorneys.

D. TURNER.
LOCK FOR NOTCHING SHEARS OF MEASURING MACHINES.
APPLICATION FILED MAY 5, 1920.

1,421,863.

Patented July 4, 1922.
4 SHEETS—SHEET 2.

Inventor:
Douglas Turner.
By Elliott & Ammen
Attorneys.

D. TURNER.
LOCK FOR NOTCHING SHEARS OF MEASURING MACHINES.
APPLICATION FILED MAY 5, 1920.
1,421,863.
Patented July 4, 1922.
4 SHEETS—SHEET 3.
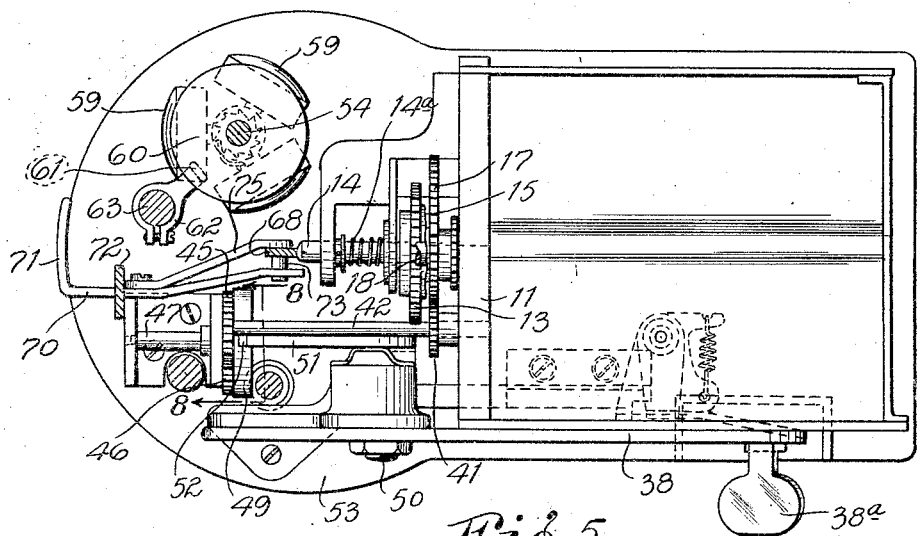
Fig. 5.
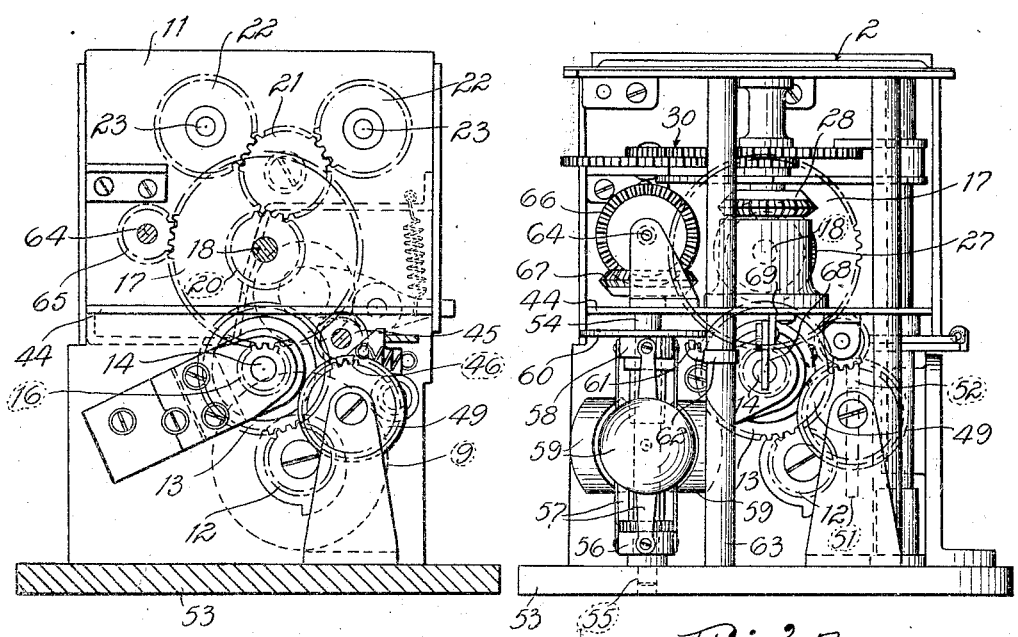
Fig. 6.
Fig. 7.
Inventor:
Douglas Turner.
By Elliott & Annin
Attorneys.

D. TURNER.
LOCK FOR NOTCHING SHEARS OF MEASURING MACHINES.
APPLICATION FILED MAY 5, 1920.
1,421,863.
Patented July 4, 1922.
4 SHEETS—SHEET 4.
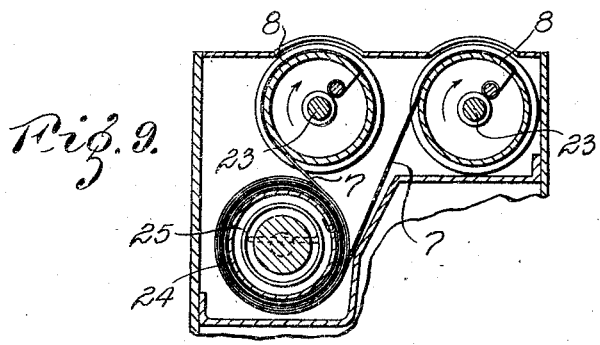
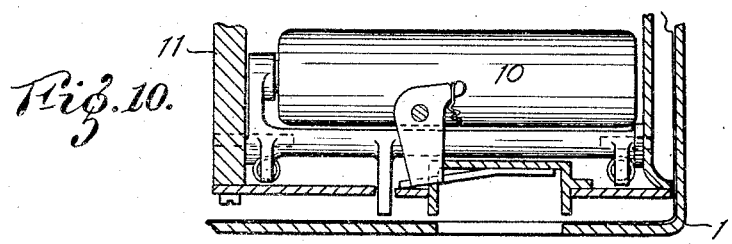
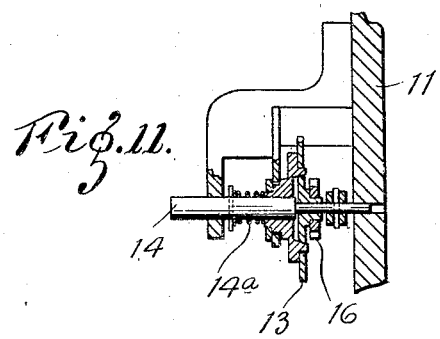
Inventor:
Douglas Turner.
By Elliott & Ammen
Attorneys.

UNITED STATES PATENT OFFICE.

DOUGLAS TURNER, OF ST. LOUIS, MISSOURI, ASSIGNOR TO MEASUREGRAPH COMPANY, OF ST. LOUIS, MISSOURI, A CORPORATION.

LOCK FOR NOTCHING SHEARS OF MEASURING MACHINES.

1,421,863. Specification of Letters Patent. Patented July 4, 1922.

Application filed May 5, 1920. Serial No. 379,172.

*To all whom it may concern:*

Be it known that I, DOUGLAS TURNER, a citizen of the United States, residing in the city of St. Louis and State of Missouri, have invented new and useful Improvements in Locks for Notching Shears of Measuring Machines, of which the following is a specification.

This invention relates to fabric measuring machines. Such machines include in their construction indicating mechanism which is advanced by pulling the fabric to be measured through the machine. After the desired quantity of fabric has been measured off, it is usual to mark the edge of the fabric with a short cut to indicate the point where the fabric is to be cut off. The indicating mechanism usually indicates fractions of a yard and inches, and usually includes a movable part or pointer for indicating the number of yards and fractions of yards which have been measured. It sometimes happens that if the machine is operated carelessly, the amount of fabric cut off will not be exactly the amount desired by the customers. The general object of the present invention is to provide means for preventing the making of careless measurements. More specifically, my object is to provide locking means which operates automatically to prevent the actuation of the marking means or shears, which mark the edge of the goods where it is to be cut off unless the indicating mechanism indicates some predetermined fraction of the unit of measurement, for example, $\frac{1}{8}$ of a yard, $\frac{1}{4}$ of a yard, etc. In other words, according to my invention the marking means can be operated only when the indicating mechanism indicates some usual fraction of a yard, and it cannot be operated when the indicating mechanism is indicating any other measurement. This insures that careless measurements cannot be taken. The indicating mechanism is driven from the measuring roller through a clutch. One of the objects of my invention is to provide very simple means for opening this clutch at will to permit the indicating mechanism to be reset to the zero position. Such machines usually include a centrifugal brake to prevent the racing of the indicating mechanism in returning to zero. One of the objects of my invention is to provide an improved organization of parts, which enables the shaft of the centrifugal governor to be mounted in a very simple manner and in a vertical plane.

The general object of the invention has been to produce a compact efficient organization of the parts.

Further objects of the invention will appear hereinafter.

The invention consists in the novel features, and in the general combination of parts to be particularly described hereinafter, all of which contribute to produce a simple and efficient lock for notching shears of measuring machines. A preferred embodiment of my invention will be particularly described in the following specification, while the broad scope of my invention will be pointed out in the appended claims.

In the drawing,

Figure 5 is a plan and section taken about on the line 5—5 of Figure 2;

Figure 6 is an elevation of the main frame plate of the machine and indicating the driving mechanism for driving the indicating mechanism from the measuring roller, certain parts being shown in cross-section;

Figure 7 is an end elevation of the machine, removed from the casing, certain parts being broken away;

Figure 8 is a detail view further illustrating the locking means; this section is taken on the line 8—8 of Fig. 5;

Figure 9 is a vertical section illustrating the arrangement of the charts and take-up rollers;

Figure 10 is a horizontal section illustrating details of the presser roller;

Figure 11 is a vertical section taken along the axis of the clutch shaft.

Figure 1:
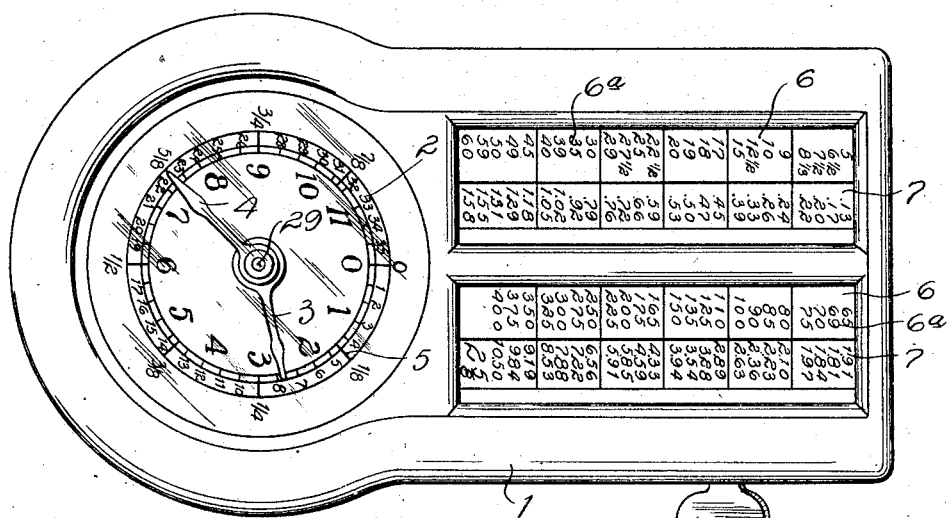
Figure 1 is a plan of a fabric measuring machine embodying my invention.

Referring more particularly to the parts, the machine comprises a casing or case 1, (see Fig. 1), in the upper portion of which there is mounted fixed scales, one of which may be in the form of a dial 2 which constitutes a part of the indicating mechanism for indicating the length of the piece of fabric measured off on the machine. The indicating mechanism may also include a movable indicating part, such as the pointer 3 which co-operates with the large numbers 1, 2 and 3, etc., on the face of the dial, and which indicate units of measure, such as yards. This pointer makes one complete revolution in the greatest possible measuring movement of the indicating mechanism. There is also provided a second pointer which moves at a higher rate of speed than the pointer 3, and this hand or pointer 4 co-operates with division lines 5 which are fractional division lines and indicate eighths of the unit of measure, for example, eighths of a yard. The spaces between the fractional division lines 5 may be divided off into inches.

This particular machine includes cost computing means in the indicating mechanism, that is to say, it includes fixed scales 6 with which co-operate movable charts 7 which are mounted in the machine in any suitable manner, being wound upon take-up rollers 8, 8 (see Fig. 9).

Figure 4:
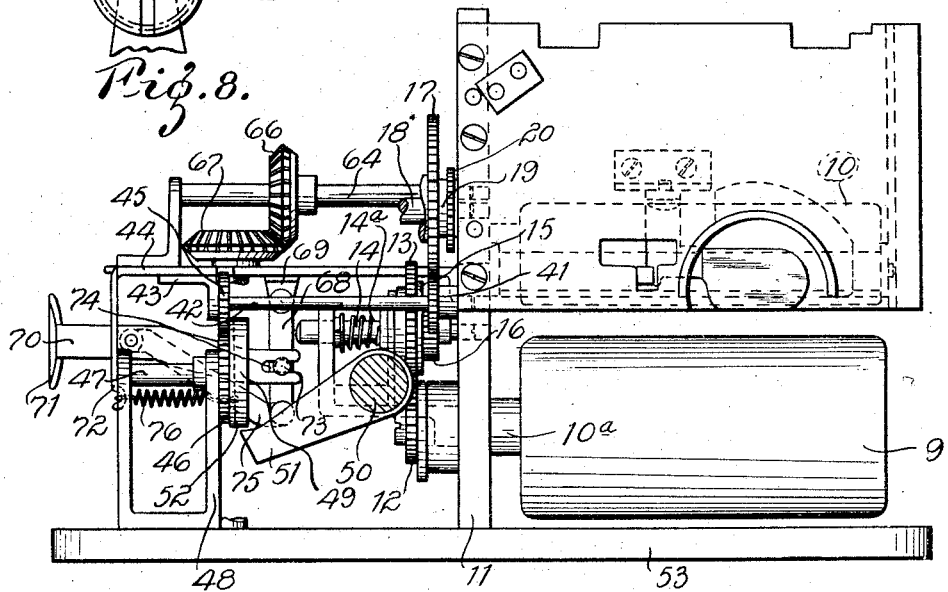
Figure 4 is a side elevation similar to Figure 2, but showing certain parts in section.
Figure 3:
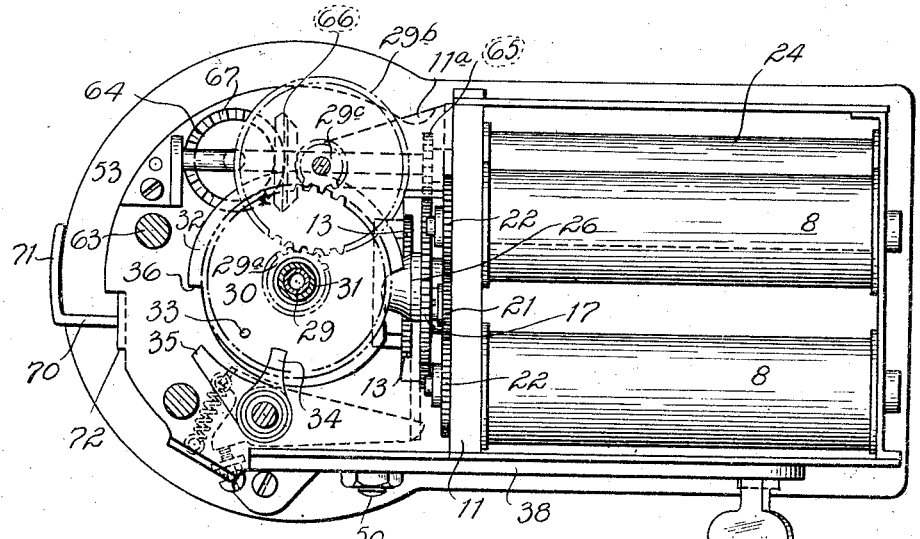

The machine is provided with a measuring roller 9 which is mounted to rotate in the lower part of the casing, and with this roller co-operates a presser roller 10 which presses the fabric down on the upper face of the measuring roller when the fabric is being pulled through the machine and past the measuring roller. In Figure 4 the presser roller is shown in an elevated position. The indicating mechanism is driven by suitable driving mechanism from the measuring roller and this driving mechanism includes a clutch which may be opened at will when the indicating mechanism is to be returned to the zero position. For this purpose the shaft 10$^a$ of the measuring roller is rotatably mounted in the main vertical frame plate 11, extends beyond this plate and carries a pinion 12. This pinion meshes with a gear wheel 13 mounted on a clutch shaft 14. The gear wheel 13 constitutes one of the clutch members and co-operates with a movable clutch member 15 which is attached to the clutch shaft 14, so that when the clutch shaft 14, is moved inwardly it slides through the gear wheel 13 and opens the clutch. Carried by the clutch shaft 14, I provide a pinion 16, and when the clutch is in its closed position this pinion drives a large gear wheel 17 carried on a horizontal shaft 18 (see Figs. 4 and 6). This gear wheel 17 is connected by a sleeve 19 with a pinion 20 and this pinion meshes with an idle gear wheel 21 (see Fig. 6), which meshes with two gear wheels 22 mounted on the shafts 23 of the aforesaid take-up rollers 8. The charts 7 are normally wound upon a drum 24 (see Fig. 9) and this drum is provided with a spring 25 which tends to wind the charts upon the drum. With this construction, it will be evident that when the measuring roller 9 is rotated, the take-up rollers 8 will be rotated in the direction indicated by the arrows in Figure 9 and this will wind the charts off of the drum 24 and onto the take-up rollers. The numbers on the charts 7 are in alignment with numbers 6$^a$ on the scales 6 which indicate different prices per yard, and the numbers on the charts will indicate the charge to be made for any number of yards, or fractions of yards indicated by the hands 3 and 4 of the indicating mechanism. When the clutch is open, the spring 25 returns the indicating mechanism to its zero position and in doing so returns the hands 3 and 4, as well as the charts 7.

The clutch composed of the clutch members 13 and 15 is normally held closed by a coil spring 14$^a$ disposed around the clutch shaft 14, (see Figs. 4 and 11).

Figure 3:
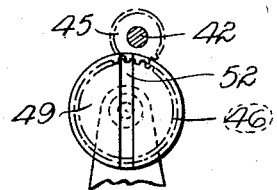
Figure 3 is a plan of the machine shown in Figure 2, but with the case removed, and with certain of the vertical shafts shown in cross-section.
Figure 2:
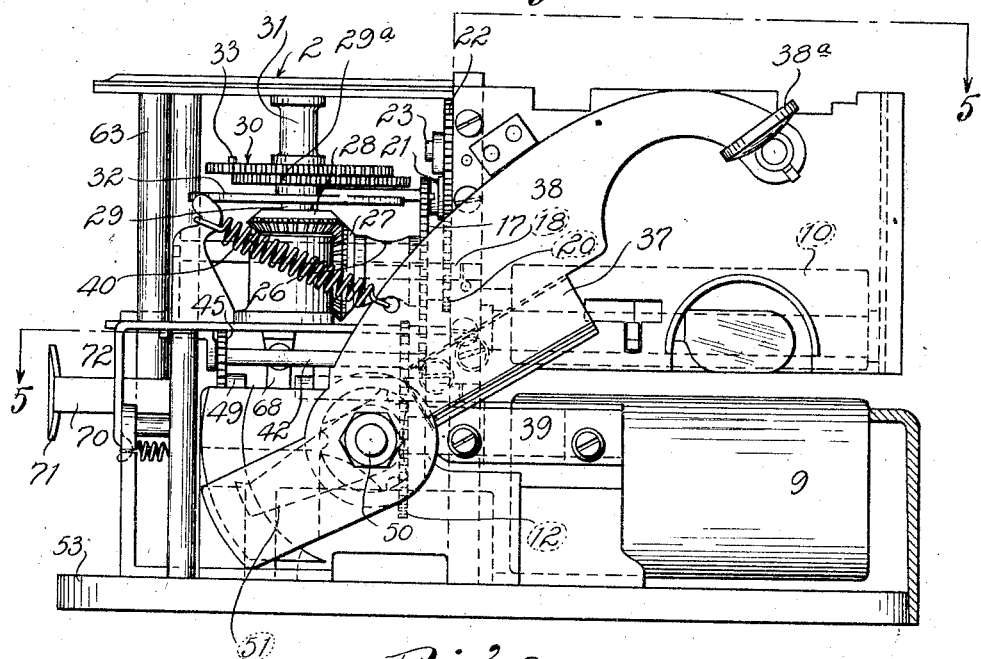
Figure 2 is a side elevation of the machine removed from its case.

In order to drive the indicating hands 3 and 4 the gear wheel 17 carries a sleeve in the form of a spool 26, and the inner end of this sleeve carries a bevel gear 27 (see Fig. 2) which meshes with a corresponding bevel gear 28 on the lower end of a tubular vertical spindle 29 which carries the fast moving pointer or hand 4. This spindle 29 carries a pinion 29$^a$ meshing with a large gear 29$^b$ supported on a bracket 11$^a$ (see Fig. 3). Gear 29$^b$ carries a rigid pinion 29$^c$ that meshes with a large gear 30 loose on spindle 29. This gear 30 is carried on a large sleeve 31 that carries the slow moving pointer or hand 3. These gears constitute a reducing mechanism designed to give a twelve-to-one reduction from the spindle 29 to the sleeve or tubular shaft 31; and this gear 30 makes one complete rotation in the greatest measuring movement of the machine, that is to say, 12 yards.

With this organization of parts, it will be evident that when the spring 25 returns the charts to zero it will also return the indicating hands 3 and 4 to zero.

In order to stop the indicating mechanism at the zero position, I provide a stop-wheel or disc 32 carried by the spindle 29 which rotates with the fast moving pointer 4. The gear wheel 30 carries a pin 33 and when the mechanism is being returned to zero this pin strikes the left side of a finger 34 (see Fig. 3) and rocks the finger toward the right. This finger or pawl is rigid with a dog 35 which swings in against the edge of the wheel 32 and comes into the path of a shoulder 36 that is formed in the edge of the wheel. This stops the mechanism at the zero position.

When the desired amount of fabric has been measured the fabric should be marked to indicate the point where it is to be cut off. For this purpose I provide marking means which may be in the form of a blade 37 carried by a lever 38 (see Fig. 2) and cooperating with a fixed blade 39. The blade 37 is normally held in an elevated position by a coil spring 40. I provide means for locking this knife or marking means against actuation, unless the hand 4 is in line with some one of the fractional division lines 5 of the dial. I do this so as to prevent the taking of careless measurements. It never happens that any one would wish to buy any fraction of a yard other than those indicated on the dial. By providing the machine with means for preventing the operation of the knife except as described above, it will be evident that the operator cannot cut off the goods unless the hand 4 is properly aligned with one of the ⅛ division marks.

I shall now describe the mechanism to accomplish this function. Referring especially to Figures 4, 5 and 6, the gear wheel 17 meshes with a pinion 41 which is carried on a shaft 42, one end of which is rotatably mounted in the frame plate 11 and the other end of which is rotatably mounted in a bracket 43 (see Fig. 4). This bracket is attached to the under side of a horizontal frame plate 44; adjacent to this bracket the shaft 42 carries a pinion 45 which meshes with a gear wheel 46 carried on a shaft 47 rotatably mounted in a suitable bracket 48. On the forward face of the gear wheel 46 I provide locking means in the form of a disc 49; this locking means is related to the indicating means in such a way that when the pointer 4 is at any intermediate point between two of the fractional division lines 5, it will prevent the operation or actuation of the marking means or knife 37. In order to accomplish this the gear wheels and pinions which drive the disc 49 are so proportioned that the disc 49 will make exactly one-half of a revolution while the hand 4 is passing from one of the division lines 5 to the next. In other words, I provide means which normally operates as a bar to prevent the actuation of the knife but permits the actuation of the knife when the pointer 4 is aligning with one of the division lines 5. To accomplish this mode of operation, the knife 38 is rigidly attached to a shaft 50 which extends inwardly and carries a part 51 in the form of an arm which moves with the knife 37. The lower end of this arm 51 is normally disposed just under the edge of the disc 49 and in a central position. The disc 49 is provided with a gap or slot 52 on its face (see Fig. 8). When the hand 4 is on one of the divisions, such as the division ⅜, the slot 52 will be in a vertical plane which will permit the end of the arm 51 to move upwardly and through the slot when the knife is actuated.

This machine also embodies an improvement as regards position and mounting of a centrifugal brake, the function of which is to prevent the indicating mechanism from racing in returning to zero. I simplify the mounting of the centrifugal brake and avoid the use of separate brackets for its shaft by mounting the shaft in a vertical position which is advantageous, and place the shaft between the base plate 53 of the machine and the aforesaid horizontal frame plate 44, see Figures 5 and 7, in which 54 indicates the vertical shaft of the centrifugal brake, the lower end of this shaft being mounted in a bearing 55 in the base plate 53 and carrying rigidly a collar 56 which is connected by flat arms or springs 57 with a collar 58 which is mounted to slide on the shaft 54. The arms 57 carry centrifugal weights 59 and these fly out by centrifugal force, pulling the collar 58 downwardly on the shaft 54. The collar 58 carries a friction disc 60 and when this friction disc is pulled down its under face strikes against a fixed brake-shoe 61 which is mounted on a bracket 62 attached to a frame post 63 of the machine. The brake-shoe 61 may be formed of felt or any other suitable material. The centrifugal shaft 54 is driven at a high rotative speed in any suitable manner. In order to accomplish this I provide a horizontal counter-shaft 64, (see Figs. 4 and 6). This counter-shaft is driven by the gear wheel 17 which meshes with a pinion 65 on the counter-shaft, and by means of bevel gears 66 and 67 the shaft 54 is driven, (see Fig 4).

I provide a very simple hand-operated device for sliding the clutch shaft 14 to open the clutch at will. The principal novelty in this device resides in the fact that it is constructed in such a way that only one fixed guide for guiding its operating stem 70 is necessary. Referring to Figure 4, I provide an operating lever 68 the upper end of which is pivotally mounted on a bracket 69 on the underside of the horizontal frame plate 44. This lever extends down in a substantially vertical position and its edge lies against the outer end of the clutch shaft 14. I provide an operating stem 70 which is in the form of a flat bar, the outer end of which is bent over to form a thumb head or push button 71 located on the outer side of the case. This stem 70 is guided near its outer end through a vertical guide bracket 72 which may be formed by bending down an integral part of the frame plate 44, that is to say, the stem 70 passes through a slot in this part 72; the inner end of the stem is off-set downwardly and is guided and supported on the lever 68. For this purpose I prefer to employ a pin-and-slot connection including a pin 73 attached to the side of the lever and a slot 74 at the end of the stem which engages this pin. Near its outer portion, the stem 70 is connected to the lower end of the lever 68 by a link 75. The stem 70 is normally held in the position in which it is indicated in Figure 4, by means of a retractile coil spring 76, one end of which is attached near the inner end of the link 75 and the outer end of the spring is attached to the lower end of the bracket 72. The upper and outer end of the link 75 engages the inner face of the bracket 72 and operates as a stop to limit the returning movement of the stem. With this organization of parts it will be evident that when the stem 70 is pushed in it will swing the lever 68 inwardly and thereby push in the shaft 14 of the clutch composed of the fixed clutch member 13 and the movable clutch member 15. This will open the clutch as described above.

The mode of operation of the complete machine will now be briefly described.

When the machine is in operation the fabric to be measured passes over the measuring roller 9 against which it is held by the presser roller 10 which is then in its depressed position. The rotation of the measuring roller 9 rotates the pinion 12 which drives the pinion 16 through the clutch 13—15. The details of the construction and mode of operation of this clutch are fully described in application Serial Number 310,753, fabric measuring and cost computing machine filed July 14, 1919, by John L. Wheeler. The pinion 16 drives the large gear wheel 17 which is rigid with the pinion 20 (see Figures 4 and 6) and the pinion 20 drives the idler 21 which rotates the shafts 23 of the take-up rollers 8. This winds the charts or webs 7 off of the drum 24 and increases the tension in the coil spring 25 of the drum (see Fig. 9). As the cloth is pulled through the machine and past the measuring roller 9, the indicating pointers 3 and 4 on the dial 2 rotate so as to indicate the amount of fabric which has been measured, while the charts 7 indicate the charge to be made for the fabric at any one of the different prices per yard indicated on the scales 6.

The driving of the pointers is effected through the pinion 12 and the gears 13, 16, 17 and thence through the sleeve 26 and bevel gears 27 and 28. This drives spindle 29 carrying pinion 29ª. This pinion drives gear 29ᵇ whose rigid pinion 29ᶜ drives gear 30 at a reduced speed. Gear 30 drives the slow pointer 3 carried on sleeve 31. Pointer 4 is carried on spindle 29.

When the desired amount has been measured the operator depresses the lever 38 by pressing on its thumb plate 38ª, and in this way, the knife 37 notches or cuts the edge of the fabric so as to mark the point where it is to be cut off. Now if the pointer 4 which indicates inches and yard fractions is not substantially in alignment with one of the fractional division lines 5, the locking disc 49 (see Figs. 4 and 8) will bar the movement of the lever 51 which is rigidly attached to the shaft 50 of the knife lever 38. Hence, if the measurement is being carelessly taken, the operation of the knife will be prevented. However, if the measurement is carefully taken and the pointer 4 is properly aligned with one of the fractional division lines 5, then the slot 52 in disc 49 will present itself in alignment with the arm 51 and permit the arm to move up through the slot as the knife descends. After the fabric has been marked in this way the operator pushes in the stem 70 which actuates the lever 68 to slide the clutch shaft 14, which opens the clutch 13—15, whereupon the spring 25 of the drum 24 will operate to return the indicating mechanism to the zero position.

In returning to the zero position, the racing of the indicating mechanism is prevented by the centrifugal governor, the weights 59 whereof fly out under the action of the centrifugal force and pull the friction disc 60 down against the brake-shoe 61 (see Fig. 7).

It is understood that the embodiment of the invention described herein is only one of the many embodiments my invention may take, and I do not wish to be limited in the practice of my invention nor in my claims, to the particular embodiment set forth.

What I claim is:

1. In a machine of the kind described, the combination of a measuring roller, indicating mechanism actuated thereby for measuring fabric pulled past the measuring roller, marking means independent of the indicating mechanism, and constructed to be operated at will for marking the fabric to indicate the point where it is to be cut off, locking means constructed to prevent said marking means from being actuated, said locking means being driven from the measuring roller in a definite relation to the indicating means and having means to permit the actuation of the marking means when the indicating mechanism is in any one of a plurality of predetermined positions.

2. In a machine of the kind described, the combination of a measuring roller, indicating mechanism actuated thereby for measuring fabric pulled past the measuring roller, marking means independent of the indicating mechanism, and constructed to be operated at will for marking the fabric to indicate the point where it is to be cut off, locking means in the form of a movable member driven by the measuring roller, said locking means being constructed so that it has a position in which it co-operates with the marking means to prevent the actuation of the marking means, and another position in which it permits the actuation of the marking means, said locking means being driven from the measuring roller in a definite relation to the indicating mechanism so as to permit the actuation of the marking means only when the indicating mechanism is in any one of a plurality of predetermined positions.

3. In a machine of the kind described, the combination of a measuring roller, indicating mechanism actuated thereby for measuring fabric pulled past the measuring roller, marking means independent of the indicating mechanism, and constructed to be operated at will for marking the fabric to indicate the point where it is to be cut off, locking means in the form of a movable member driven by the measuring roller and having a gap formed therein, a part connected with the marking means so as to move when the marking means is actuated, and having a path of movement normally barred by said locking means, but operating to swing through the gap of the locking means when the gap is aligned with said part, said locking means being constructed so that it has a definite relation to the indicating mechanism permitting the actuation of the marking means only when the indicating mechanism is in any one of a plurality of predetermined positions.

4. In a machine of the kind described, the combination of a measuring roller, indicating mechanism actuated thereby for measuring fabric pulled past the measuring roller, marking means independent of the indicating mechanism, and constructed to be operated at will for marking the fabric to indicate the point where it is to be cut off, and having a part moving therewith when the marking means is actuated, locking means in the form of a rotatable disc located in the path of said part to prevent the actuation of the marking means, said disc having a slot which may align with said part to permit the actuation of the marking means, means for driving said disc in a definite relation with respect to the indicating mechanism, said disc operating to permit the actuation of the marking means only when the indicating mechanism is in any one of a plurality of predetermined positions.

5. In a machine of the kind described, the combination of a measuring roller, indicating mechanism actuated thereby for measuring fabric pulled past the measuring roller, said indicating mechanism including a fixed scale with fractional division lines thereon indicating fractions of the unit of measure, and a movable indicating part driven by the roller and co-operating with the fixed scale to indicate fractions of the unit of measure, marking means for marking the fabric to indicate the point where it is to be cut off, and automatic means for locking said marking means against actuation when the movable indicating member indicates a measurement between two adjacent fractional division lines.

6. In a machine of the kind described, the combination of a measuring roller, indicating mechanism actuated thereby for measuring fabric pulled past the measuring roller, said indicating mechanism including a fixed scale with fractional division lines thereon indicating fractions of the unit of measure, and a movable indicating part driven by the roller and co-operating with the fixed scale to indicate fractions of the unit of measure, marking means for marking the fabric to indicate the point where it is to be cut off, and means for locking said marking means against actuation when the said movable indicating part indicates a measurement between two adjacent fractional division lines, said last named means constructed to permit the actuation of the marking means when the movable part is in substantial alignment with any one of the fractional division lines.

7. In a machine of the kind described, the combination of a case, a frame therein, a measuring roller, driving mechanism for actuating the indicating mechanism from the measuring roller, and including a clutch, a lever mounted on the frame, within the case, a stem for actuating the lever from outside the case, means for guiding the stem on said frame, means for guiding the stem on said lever, and a link for connecting the stem with the lever to actuate the lever, said lever engaging a part of the clutch for opening the same.

8. In a machine of the kind described, the combination of a case, a frame therein, a measuring roller, indicating mechanism, driving mechanism for actuating the indicating mechanism from the measuring roller, and including a clutch, a lever mounted on the frame for opening the clutch at will, a stem for actuating the lever from outside the case, said stem and said lever having a pin-and-slot connection for guiding the stem on the lever, means for guiding the stem on the frame, and a link for connecting the stem with the lever, said lever engaging a part of the clutch for opening the same.

9. In a machine of the kind described, the combination of a case, a base plate, a frame within said case mounted on said base plate, a substantially horizontal frame plate, indicating mechanism, a measuring roller, driving mechanism, including a clutch for driving the indicating mechanism from the measuring roller, a lever pivotally mounted on said frame plate for opening the clutch at will, means for returning the indicating mechanism to zero, a centrifugal brake actuated when the indicating mechanism is returning to zero, and having a shaft rotatably mounted on said base plate and said frame plate, a stem for actuating the lever from outside the case, means for guiding the stem on said frame, means for guiding the stem on the lever, and a link for connecting the stem with the lever to actuate the lever to open the clutch.

In testimony whereof, I have hereunto set my hand.

DOUGLAS TURNER.